United States Patent
McMahon et al.

(10) Patent No.: US 7,035,066 B2
(45) Date of Patent: Apr. 25, 2006

(54) ARC-DEFAULT DETECTING CIRCUIT BREAKER SYSTEM

(75) Inventors: Roy P. McMahon, Indianapolis, IN (US); Gregory S. AmRhein, Greenwood, IN (US); James A. Reinhardt, Indianapolis, IN (US)

(73) Assignee: Raytheon Company, Waltham, MA (US)

(*) Notice: Subject to any disclaimer, the term of this patent is extended or adjusted under 35 U.S.C. 154(b) by 479 days.

(21) Appl. No.: 10/328,658

(22) Filed: Dec. 23, 2002

(65) Prior Publication Data

US 2004/0070898 A1  Apr. 15, 2004

Related U.S. Application Data

(63) Continuation-in-part of application No. 09/585,600, filed on Jun. 2, 2000, now Pat. No. 6,532,140.

(51) Int. Cl.
  *H02H 9/08* (2006.01)

(52) U.S. Cl. .......................... 361/42; 361/43
(58) Field of Classification Search .................. 361/42, 361/43, 44, 45, 46, 47, 48, 49, 50
See application file for complete search history.

(56) References Cited

U.S. PATENT DOCUMENTS

| | | | |
|---|---|---|---|
| 4,822,983 A | | 4/1989 | Bremner et al. |
| 4,858,054 A | * | 8/1989 | Franklin ........................ 361/57 |
| 5,182,464 A | * | 1/1993 | Woodworth et al. .......... 307/87 |
| 5,208,542 A | | 5/1993 | Tennies et al. |
| 5,224,006 A | | 6/1993 | MacKenzie et al. |
| 5,510,946 A | | 4/1996 | Franklin |
| 5,691,869 A | | 11/1997 | Engel et al. |
| 5,706,154 A | | 1/1998 | Seymour |
| 5,805,397 A | | 9/1998 | MacKenzie |
| 5,815,352 A | | 9/1998 | Mackenzie |
| 5,818,671 A | | 10/1998 | Seymour |
| 5,886,861 A | * | 3/1999 | Parry ........................... 361/42 |
| 5,889,643 A | | 3/1999 | Elms |
| 5,940,526 A | | 8/1999 | Setlak |
| 5,943,198 A | * | 8/1999 | Hirsh et al. ................... 361/42 |
| 5,963,405 A | | 10/1999 | Engel |
| 5,966,281 A | | 10/1999 | Larson |
| 5,982,593 A | | 11/1999 | Kimblin |
| 6,014,297 A | | 1/2000 | Clarey |
| 6,057,997 A | | 5/2000 | Mackenzie |
| 6,198,611 B1 | | 3/2001 | Macbeth |
| 6,259,996 B1 | | 7/2001 | Haun et al. |
| 6,522,509 B1 | * | 2/2003 | Engel et al. .................. 361/42 |
| 6,633,467 B1 | * | 10/2003 | Macbeth et al. .............. 361/42 |

FOREIGN PATENT DOCUMENTS

| | | |
|---|---|---|
| EP | 0 510 795 A2 | 10/1992 |
| WO | WO/00/8663 | 2/2000 |

* cited by examiner

*Primary Examiner*—Brian Sircus
*Assistant Examiner*—Danny Nguyen
(74) *Attorney, Agent, or Firm*—Daly, Crowley, Mofford & Durkee, LLP (57) ABSTRACT

An arc-fault detecting circuit-breaker system is operable with a protected electrical circuit that operates with direct current or alternating current. A normally closed line circuit breaker has an electrical input and an electrical output, and an electrical line connects the electrical output to the protected-element input. The system includes a detector of the rate of change with time of a current flow in the electrical line. An activating element alternating current voltage source has an alternating current output. A circuit-breaker activating element is operable responsive to the detector. The circuit-breaker activating element is electrically connected between the electrical line and the alternating current output. The circuit breaker activating element is a normally open switch that closes to establish a connection between the electrical line and the alternating current output in the event that the detector detects a rate of change of current with time in excess of a permitted maximum rate-of-change value.

18 Claims, 6 Drawing Sheets

FIG. 14 ns
ARC-DEFAULT DETECTING CIRCUIT BREAKER SYSTEM

This application is a continuation-in-part of application Ser. No. 09/585,600, filed Jun. 2, 2000, now U.S. Pat. No. 6,532,140, for which priority is claimed and whose disclosure is incorporated by reference.

This invention relates to circuit breaker systems and, more particularly, to an arc-fault detecting circuit-breaker system responsive to the occurrence of arcing in a protected DC or AC electrical circuit.

BACKGROUND OF THE INVENTION

Aircraft electrical systems are normally protected from high current and electrical shorts by circuit breakers. These circuit breakers are designed to remove power from a protected electrical circuit if an electrical current above a preset value is passed through the device. These high currents may occur for a number of reasons, such as a failure occurring in a piece of electrical equipment or damage occurring in a section of wiring insulation allowing the conductor to come into electrical contact with the structure of the aircraft, which is normally at ground potential.

Due to the nature of the circuit breaker mechanism, the tripping (opening) of the circuit breaker is not "instantaneous". Some types of circuit breakers are allowed to continue supplying current for up to 40 seconds at twice their specified trip currents. An overload of five times the rated current may be allowed to flow for up to three seconds before a trip must occur. The trip delays are allowed because these devices rely on the overcurrent to heat up a bimetallic strip that functions as the detection element within the circuit breaker.

Circuit breakers conforming to these requirements have been used in aircraft for many years. Under normal operating conditions and under normal fault conditions, they operate satisfactorily. However, there are some fault conditions where the tripping delay greatly affects the ability of the circuit breaker to protect life and property. For example, certain types of wiring failures allow for a fault to ground which is not a "dead short", meaning a direct, virtually zero-resistance electrical connection to ground. Some types of wiring insulations arc track when electrically faulted, which locally turns the material from an insulator to a conductor. An arc-tracked wire can be shorted to ground through a resistance which serves as a current limiter, which in turn allows the current to flow through the wire to the fault for some time until the circuit breaker is tripped. Until that occurs, the high current flow can damage and arc track other wires, adding their electrical supplies into the fault. This fault may initiate a cascading chain reaction which quickly compromises the safety of the aircraft.

These types of events occur sufficiently often in aircraft wiring systems that there is a need for a device which can detect arcing faults and remove electrical power from the protected electrical circuit more quickly than can a standard circuit breaker, while at the same time not tripping if an arc occurs in normal operation such as the arc that may occur when a switch is closed. This need is particularly acute for protecting DC electrical circuits, as well as low-frequency AC and AC electrical circuits generally. In addition, the device must meet other requirements, such as space limitations, low cost, and "invisibility" to normal operating conditions of aircraft electrical systems. The present invention fulfills this need, and further provides related advantages.

SUMMARY OF THE INVENTION

The present invention provides an arc-fault detecting circuit-breaker system and a method for its use. The arc-fault detecting circuit breaker system is suitable for protecting direct current (DC) and alternating current (AC) protected electrical circuits. The arc-fault detecting circuit-breaker system responds both to excessive currents, as does a conventional circuit breaker, and to arc faults (sometimes termed "sparks"), but does not trip as a result of short, normally occurring arcs such as occur when a switch is closed. These overcurrent and arc-fault-responsive functions are combined into a single arc-fault detecting circuit-breaker element that allows normal functioning of a protected electrical circuit under ordinary operating circumstances, but responds decisively when a hazardous arc fault occurs. It may be used in circumstances where conventional circuit breakers are now used, but adds the additional capability of arc-fault detection. The arc-fault detecting circuit-breaker system is highly reliable, but fails to a safe state if the arc detection circuit should fail. It is light in weight and small in volume, may be packaged in a manner similar to that of conventional circuit breakers, and is relatively inexpensive. It does not affect the normal operations of the protected electrical circuit.

In accordance with the invention, an arc-fault detecting circuit-breaker system is operable with a protected electrical circuit. The protected electrical circuit may be a direct current (DC) device or an alternating current (AC) device, such a low-frequency alternating current (AC) device having a frequency of no greater than about 200 Hertz (Hz). The arc-fault detecting circuit-breaker system comprises a normally closed line circuit breaker connected in series by an electrical line with the protected electrical circuit whose current flow is to be interrupted upon the occurrence of an arc fault. There is a detector of the rate of change with time of the current flow in at least one of the protected electrical circuit and the electrical line. An activating element alternating current voltage source has an activating element alternating current output at an activating element alternating current output frequency. Where the protected electrical circuit is an alternating current device having a protected-circuit frequency, the activating element alternating current output frequency is at least twice that of the protected-circuit frequency. A circuit-breaker activating element is operable responsive to the detector. The circuit-breaker activating element is electrically connected between the electrical line and the activating element alternating current output. The circuit-breaker activating element is a normally open switch that closes to establish a connection between the electrical line and the alternating current output in the event that the detector detects a rate of change of current with time in excess of a permitted maximum rate-of-change value.

The detector may be a detector of magnetic flux in the protected electrical circuit. The detector preferably includes a transformer. The versatility of the transformer in respect to the selection of the ratio of the number of turns in the output and input coils allows the output voltage to be stepped up to increase the sensitivity of detection.

In another form, the detector includes a wire in series with the protected electrical circuit, a shield overlying the wire, and a voltage monitor of the voltage in the shield between two locations lying along the length of the wire. The detector may comprise a conductive shield (such as a braided copper wire) which surrounds the electrical line that forms part of the protected electrical circuit. This structure may in turn be contained within a magnetically permeable tube. This construction has a natural built-in air gap for handling direct currents and provides a low inductance for reduced sensitivity to normal circuit variations that might induce false triggers. Low inductance and sensitivity make this form of the detector particularly useful for high-DC-current circuits.

A third type of small, magnetically efficient detector may be constructed using ferrite pot-cores of nickel-based magnetic materials which saturate readily. The small size of this detector makes it easy to incorporate the detector into a circuit breaker package. Continuous currents of 20 to 30 amperes may be handled with a small resistive loss.

The activating element alternating current voltage source may be a single phase voltage source, a two-phase voltage source, or a three-phase voltage source. There is preferably at least one circuit-breaker activating element for each of the phases of the voltage source.

In another embodiment, there are two circuit-breaker activating elements connected to the activating element alternating current voltage source. The circuit breaker system further includes an alternating gate circuit that alternatingly delivers an output of the detector to the two circuit breaker activating elements.

The circuit-breaker activating (tripping) element preferably includes a silicon-controlled rectifier (SCR) and, optionally, a resistor in the SCR gate circuit. The silicon-controlled rectifier has a gate of the silicon-controlled rectifier in electrical communication with a detector output signal of the detector. The activating element alternating current voltage source preferably has an output signal at the activating element alternating current output frequency of about 400+/−20 Hz AC power. This frequency may operate satisfactorily with DC protected electrical circuits and with an AC protected electrical circuit having a power frequency of as high as about 200 Hz. If the protected electrical circuit has a power frequency greater than about 200 Hz, a higher activating element alternating current output frequency is required, and specifically an activating element alternating current output frequency at least twice that of the power frequency.

In one preferred form, an arc-fault detecting circuit-breaker system is operable with a direct current protected electrical circuit having a protected-circuit input that receives a direct current electrical signal. The arc-fault detecting circuit-breaker system comprises a normally closed line circuit breaker having an electrical input and an electrical output, an electrical line connecting the electrical output of the normally closed line circuit breaker to the protected-element input, and a detector of the rate of change with time of a current flow in the electrical line. An activating element alternating current voltage source has an alternating current output. A circuit-breaker activating element is operable responsive to the detector. The circuit-breaker activating element is electrically connected between the electrical line and the alternating current output of the activating element alternating current voltage source. The circuit breaker activating element is a normally open switch that closes to establish a connection between the electrical line and the alternating current output in the event that the detector detects a rate of change of current with time in excess of a permitted maximum rate-of-change value. Other compatible features discussed herein may be used with this embodiment as well.

In another preferred form, an arc-fault detecting circuit-breaker system is operable with a protected electrical circuit having an protected-circuit input that receives an alternating current electrical signal at a protected circuit frequency. The arc-fault detecting circuit-breaker system comprises a normally closed line circuit breaker having an electrical input and an electrical output, an electrical line connecting the electrical output of the normally closed line circuit breaker to the protected-element input, a detector of the rate of change with time of a current flow in the electrical line, and an activating element alternating current voltage source having an activating element alternating current output at an activating element alternating current output frequency at least twice that of the protected-circuit frequency. A circuit-breaker activating element is operable responsive to the detector. The circuit-breaker activating element is electrically connected between the electrical line and the alternating current output, and the circuit breaker activating element is a normally open switch that closes to establish a connection between the electrical line and the alternating current output in the event that the detector detects a rate of change of current with time in excess of a permitted maximum rate-of-change value.

Nominally identical semiconductor devices usually have a variation or spread of operating parameters. The circuit-breaker activating elements may be made to function more identically in respect to external circuitry if appropriate series current feedback is used. In this embodiment, an impedance (series resistor) is inserted into the gate drive line. The series resistor preferably has a value of several times the effective gate dynamic resistance at the trigger point. The price of this feedback is requirement for a larger applied drive voltage from the detector. Larger values of the series resistor lower the sensitivity of the circuit.

The present arc-fault detecting circuit-breaker system is operable to detect both conventional overcurrent conditions and also arcing conditions, and to interrupt the circuit of the protected electrical circuit upon the occurrence of either type of condition. In the case of an arcing condition, the system interrupts the circuit much more quickly than would a conventional circuit breaker, thereby providing better protection to the protected electrical circuit.

The arc-fault detecting circuit-breaker system is operable to detect current changes that are smaller than the normal operating current, such as a beginning arc at the end of a long wiring harness. This capability is significant in practical operations such as in aircraft electrical systems.

In its preferred embodiments, the arc-fault detecting circuit-breaker system is light in weight and relatively inexpensive, so that it may be used to protect many circuits in aircraft flight applications where weight is an important consideration. It is also small in size, so that it may be used in new circuits, or retrofitted into existing circuits, without exceeding space constraints. The small size also permits it to be packaged into about the same package size as conventional line circuit breakers. The arc-fault circuit breaker system of the invention may be configured as an add-on supplement to an existing circuit breaker if replacement of the circuit breaker is not possible. The detector or even all of the device other than the circuit breaker itself may be remote from the circuit breaker, such as at the end of a long wiring harness.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
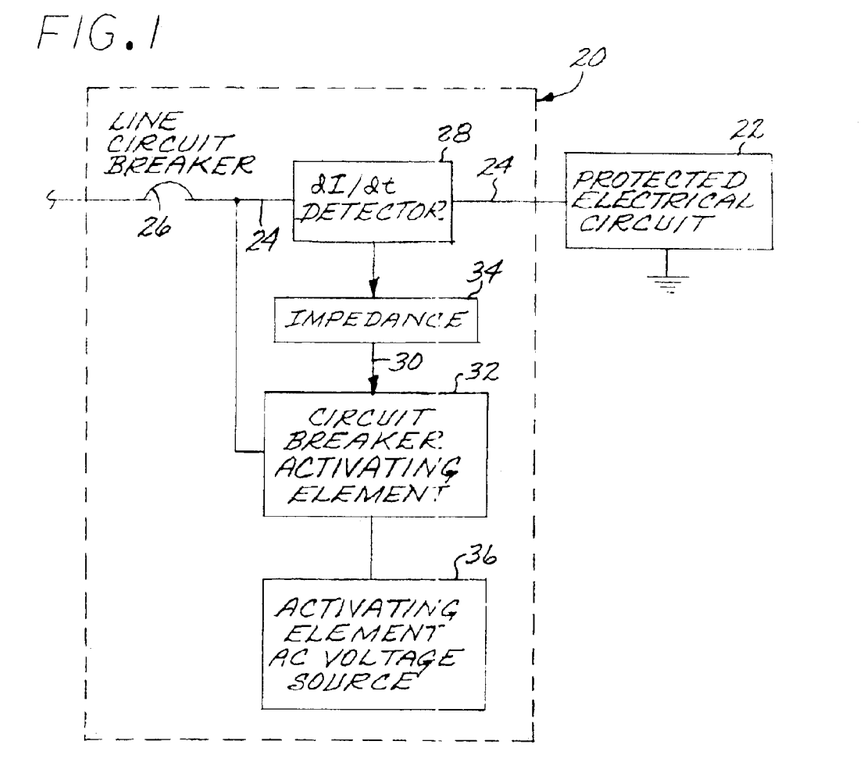
FIG. 1 is a block diagram of a preferred form of the arc-fault detecting circuit-breaker system.
Figure 2:
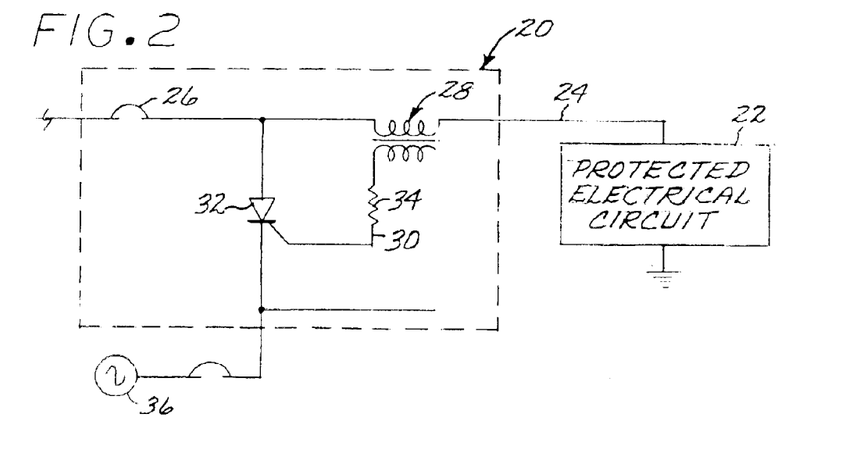
FIG. 2 is a schematic circuit diagram of an arc-fault detecting circuit-breaker system.

FIG. 1 is a block diagram of an arc-fault detecting circuit-breaker system 20, which serves to protect a protected electrical circuit 22 against overcurrents (excessively high currents) and also against arc faults. The arc-fault detecting circuit-breaker system 20 is illustrated in electrical series with the protected electrical circuit 22 through an electrical line 24. The protected electrical circuit 22 is preferably a direct current (DC) device, so that direct current flows in the electrical line 24. An example is a 28-volt DC protected electrical circuit 22 found in many aircraft electrical systems. It may instead be an alternating current (AC) device operating at a protected-circuit frequency. An AC protected-circuit frequency of particular interest is a frequency of no greater than about 200 Hertz (Hz) flowing through the electrical line 24 and termed herein a "low-frequency" AC protected electrical circuit 22. The present approach when applied to the protection of AC protected electrical circuits 22 is not limited to low-frequency AC protected electrical circuits, however. The up-to 200 Hz low-frequency protected electrical circuit is of particular interest because it may be protected by a 400 Hz activating element alternating current voltage source found in present aircraft electrical systems.

The arc-fault detecting circuit-breaker system 20 includes a circuit breaker 26. As used herein, "circuit breaker" includes both resettable circuit breakers and one-shot fuses, both of which break a circuit upon the occurrence of an overcurrent condition. The circuit breaker 26 is a normally closed component sized to allow current flow therethrough up to a selected maximum current, and then to trip or open in the event that a higher current is passed therethrough. A conventional resettable circuit breaker or one-shot fuse preferably is used as the circuit breaker 26, in conjunction with additional circuitry as described subsequently. The circuit breaker 26 functions to interrupt current flow in the electrical line 24 under selected conditions. One of the conditions is the occurrence of an excessively high electrical current (overcurrent) through the electrical line 24. The other of the conditions is the occurrence of an arc fault, sometimes called a sparking condition, which activates (opens or trips) the circuit breaker 26 by the following approach.

The occurrence of the arc-fault is sensed by a detector 28 which preferably measures the rate of change of electrical current I in the electrical line 24 as a function of time t, or dI/dt, and is most preferably a transformer. The use of transformer coils and the ratio of the number of turns of wire in the output (secondary) coil and the input (primary) coil of the transformer allows the voltage in the output coil to be increased, facilitating the detection. An output signal 30 of the detector 28 is supplied to a circuit breaker activating element 32, which causes the activating element 32 to divert power away from the protected electrical circuit 22 and draw power through the heat sensitive element of the circuit breaker 26 until the oscillating AC voltage of an activating element AC voltage source 36 rises above the operating voltage of the electrical line 24, which stops the power-diverting action. If the detector 28 detects an arc again, the process repeats. Repeated events will quickly divert sufficient power through the circuit breaker 26 to trip the heat-sensitive element of the circuit breaker 26 and remove power from the circuit.

With this approach, the circuit breaker 26 is responsive to both excessive currents and excessive rates of change of electrical current with time. The detector 28 acts as a low-pass filter. It responds to fast transients of sufficient amplitude which may have such a small heating value that the standard circuit breaker element cannot respond to them. Slowly rising, low-amplitude events are ignored by the detector 28 and are sensed by the circuit breaker 26.

The mutual impedance of the detector 28 transfers power, with a suitable wave shape, to the circuit breaker activating element 32. This power may be larger than that required to trigger the circuit breaker activating element 32. An impedance 34, such as a resistor, may optionally be inserted into the line carrying the output signal 30 to act as a sensitivity, trigger point, or device operation equalization control, because the series impedance tends to offset the characteristic variations in the input of the circuit breaker activating element 32.

The circuit breaker activating element 32 is connected to the activating element alternating current voltage source 36 having an alternating current output at an activating element alternating current output frequency. The activating element alternating current voltage source 36 has an activating element alternating current output frequency that is most preferably about 400+/−20 Hz, which is available in many aircraft electrical systems. However, the activating element alternating current output frequency may be lower or higher, within limitations discussed herein. When the protected electrical circuit is an alternating current device having a protected-circuit frequency, the activating element alternating current output frequency must be at least twice that (i.e., two times or greater) of the protected-circuit frequency.

FIGS. 2–14 illustrate embodiments of the arc-fault detecting circuit breaker system 20 in greater detail. In these figures, elements corresponding to those of the other figures are given the same reference numerals, and the discussion of those elements is incorporated. Compatible and operable features of each of these embodiments may be used in other embodiments.

In each of the embodiments, the circuit breaker activating element 32 preferably contains a silicon-controlled rectifier (SCR). The SCR 32 controllably connects the electrical line 24, preferably at a point between the circuit breaker 26 and the detector 28, to the activating element alternating current output of the activating element AC voltage source 36. In the typical case where the electrical line 24 carries 28-volt DC power, the activating element AC voltage source 36 is preferably 400 Hz, 115 volt alternating current. In another example, 60 Hz 115 volt power may be carried on the electrical line 24 with 400 Hz 115 volt alternating current as the activating element alternating current output of the activating element AC voltage source 36.

One of the requirements of the arc-fault detecting circuit breaker system 20 is that it not open the circuit breaker 26 for normal transient events such as the closing of a switch, which generates an arc of short duration, but that it does open the circuit breaker 26 for multiple arcs such as experienced when there are shorting wires or the like in the electrical line 24 (which is the protected-circuit input) or protected electrical circuit 22. If the cathode of the SCR were connected to ground instead of to the activating element AC voltage source 36 and the detector 28 operated to trigger the gate of the SCR, the electrical current in the line 24 would be connected directly to ground and the current would continue flowing until the circuit breaker 26 tripped. Connecting the SCR to ground is therefore not practical for protecting DC and low-frequency AC circuits (i.e., DC or low-frequency AC current in the electrical line 24) because a single arc event would cause a loss of power to the protected electrical circuit 22 on every occurrence. For practical DC and low-frequency AC operation, a method to systematically reverse bias the voltage across the SCR must be used. By connecting the cathode of the SCR to an AC power source (i.e., the activating element AC voltage source 36) which periodically has a voltage level higher than that of the protected DC or low-frequency AC protected electrical circuit 22 and the electrical line 24, the voltage bias across the SCR will be reversed for some length of time of every cycle of the AC voltage source 36. At other times in the AC power cycle, the AC voltage is lower than the DC or low-frequency AC operating voltage of the electrical line 24 and a triggering of the SCR will flow current. By utilizing an AC power source with a nominal frequency of 400 Hz, which is commonly found in aircraft electrical systems, as the activating element AC voltage source 36, the maximum duration of any one SCR shorting cycle is less than 1.3 milliseconds. Since short duration transients are typically shorter than the 1.3 milliseconds of a 400 Hz half cycle, the SCR will conduct for a maximum of that length of time, which is not long enough to overheat and open even a one-amp circuit breaker. Consequently, for the case of DC current in the electrical line 24, the cathode of the SCR is connected to a high frequency AC signal produced by the activating element AC voltage source 36 to prevent it from activating as a result of the occurrence of short-duration transient arcs such as produced by switch closings and the like. This timing requirement also establishes the maximum AC protected-circuit frequency of the protected electrical circuit 22 as about one-half that of the activating element alternating current output frequency.

Figure 3:
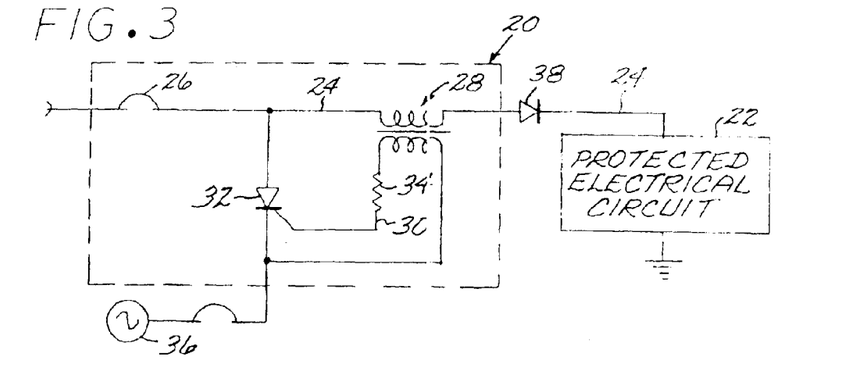
FIG. 3 is a schematic circuit diagram of an arc-fault detecting circuit-breaker system with reverse diode protection at the load terminal.

In the embodiment of FIG. 3, the arc-fault detecting circuit breaker system 20 further includes a power diode 38 in the electrical line 24 between the circuit breaker 26 and the protected electrical circuit 22. The power diode 38 may be internal to the arc-fault detecting circuit breaker system 20, or external to it at the load terminal to which the protected electrical circuit 22 is connected. The power diode 38 prevents the activating element AC voltage source 36 from drawing current through the protected electrical circuit 22 after the circuit breaker 26 has opened. The SCR 32 could otherwise stay activated until the AC voltage goes positive if the circuit breaker 26 opened when the AC voltage was negative, and the power diode 38 prevents drawing current from the protected electrical circuit 22 in that event.

Figure 4:
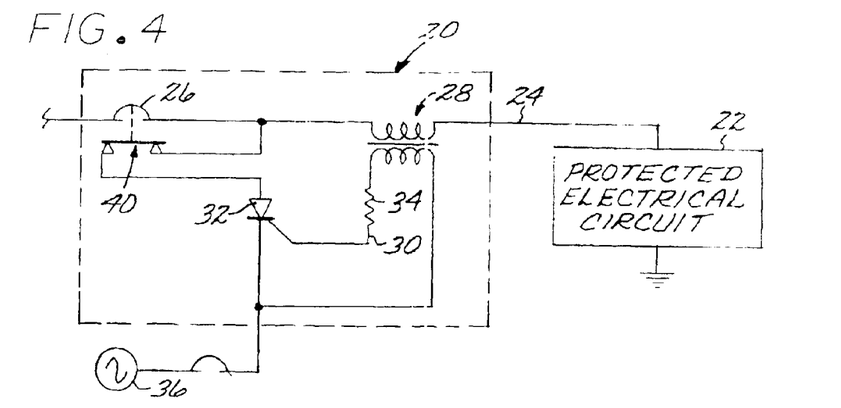
FIG. 4 is a schematic circuit diagram of an arc-fault detecting circuit-breaker system with SCR anode interruption contacts.

In the embodiment of FIG. 4, an internal set of electrical contacts 40 are operated in parallel with the contacts of the circuit breaker 26. The SCR anode connection flows through the set of electrical contacts 40. The electrical contacts 40 open when the circuit breaker 26 opens. This configuration stops all current flow through the SCR 32 when the circuit breaker 26 opens, to prevent any reversal flow of current through the protected electrical system 22 after the circuit breaker 26 opens.

Figure 5:
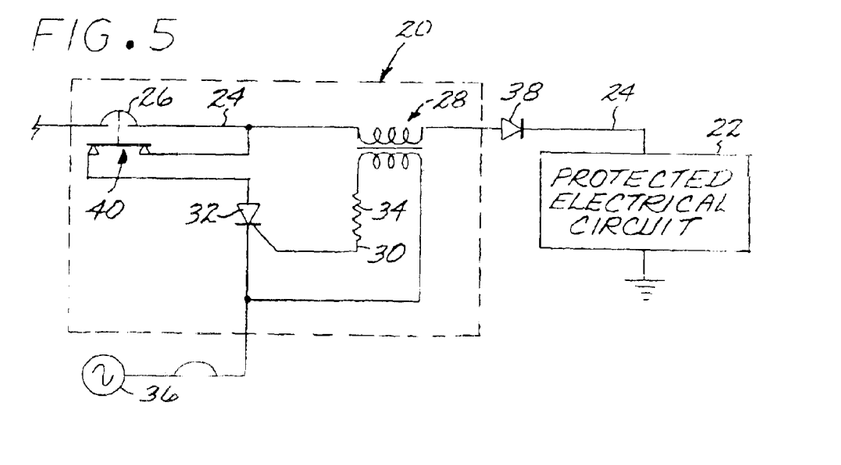
FIG. 5 is a schematic circuit diagram of an arc-fault detecting circuit-breaker system with reverse diode protection at the load terminal and SCR anode interruption contacts.
Figure 6:
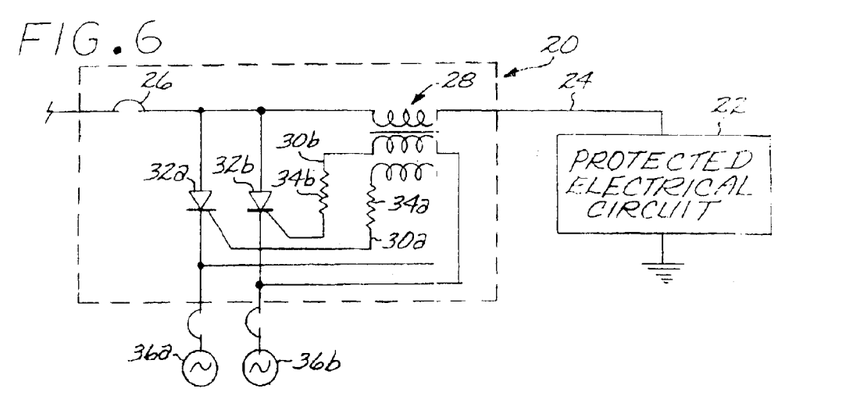
FIG. 6 is a schematic circuit diagram of an arc-fault detecting circuit-breaker system with two-phase electrical power.
Figure 7:
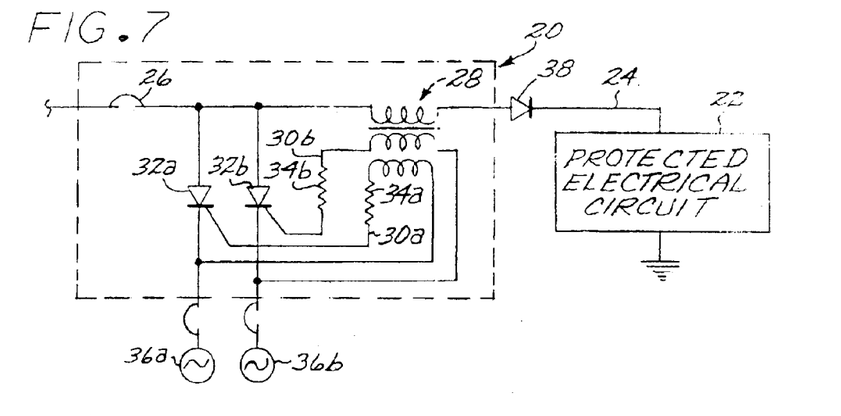
FIG. 7 is a schematic circuit diagram of an arc-fault detecting circuit-breaker system with two-phase electrical power and reverse diode protection at the load terminal.
Figure 8:
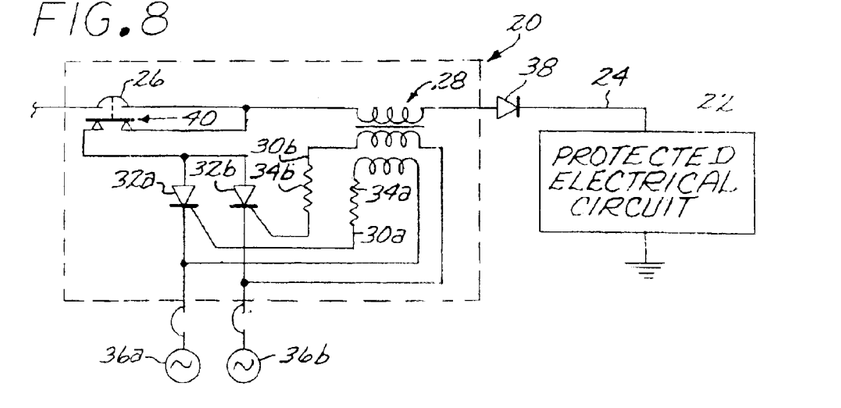
FIG. 8 is a schematic circuit diagram of an arc-fault detecting circuit-breaker system with two-phase electrical power, reverse diode protection at the load terminal, and SCR anode interruption contacts.
Figure 9:
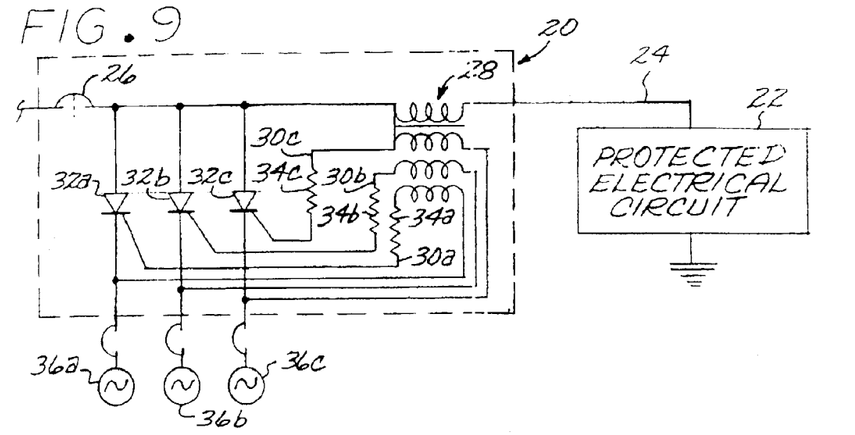
FIG. 9 is a schematic circuit diagram of an arc-fault detecting circuit-breaker system with three-phase electrical power.
Figure 10:
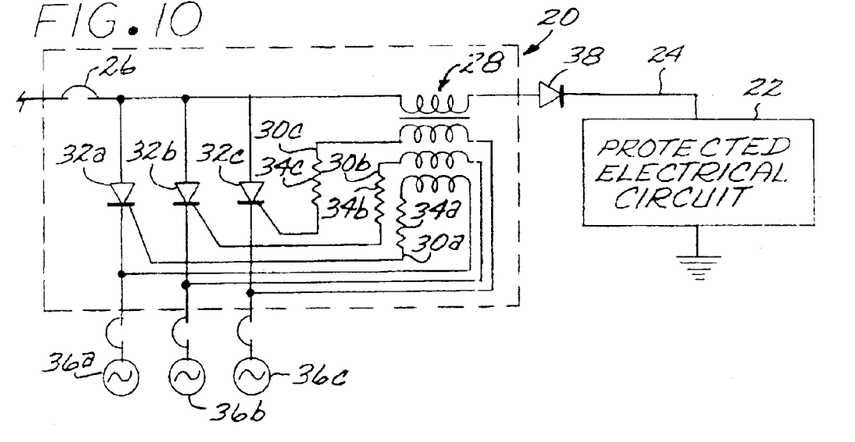
FIG. 10 is a schematic circuit diagram of an arc-fault detecting circuit-breaker system with three-phase electrical power and reverse diode protection at the load terminal.
Figure 11:
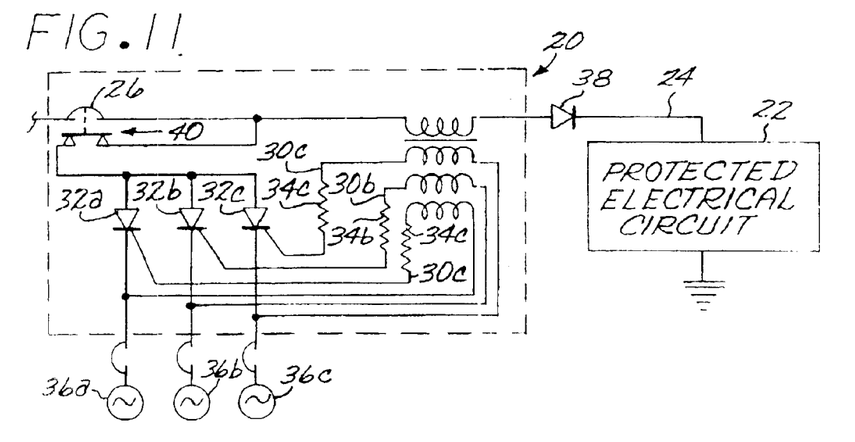
FIG. 11 is a schematic circuit diagram of an arc-fault detecting circuit-breaker system with three-phase electrical power, reverse diode protection at the load terminal, and SCR anode interruption contacts.

The embodiment of FIG. 5 uses both the power diode 38 and the set of electrical contacts 40.

Improved protection may be obtained if multiple phases are used in the activating element AC voltage source 36, as illustrated in FIGS. 6–11. In aircraft, 115 volt, 400 Hertz power is normally available as three-phase power. The use of two of the three phases to protect the protected electrical circuit 22 reduces the extent of unprotected periods in the power cycle, and the use of three phases reduces the unprotected periods even further. A DC protected electrical circuit 22 is protected completely when using three phases for protection in the activating element AC voltage source 36.

FIGS. 6–11 illustrate circuits using two (FIGS. 6–8) and three (FIGS. 9–11) electrical phases of protection in the activating element AC voltage source 36. In these figures, the circuit elements associated with each phase are denoted by respective suffixes. Elements 30$a$, 32$a$, 34$a$, and 36$a$ are associated with Phase A of the AC power in the activating element AC voltage source; elements 30$b$, 32$b$, 34$b$, and 36$b$ are associated with Phase B of the AC power in the activating element AC voltage source; and elements 30$c$, 32$c$, 34$c$, and 36$c$ are associated with Phase C of the AC power in the activating element AC voltage source. The prior description of the elements 20, 22, 24, 26, 28, 30, 32, 34, 36, 38, and 40 is incorporated here, and applied to the respective elements related to the various electrical phases as appropriate.

Figure 12:
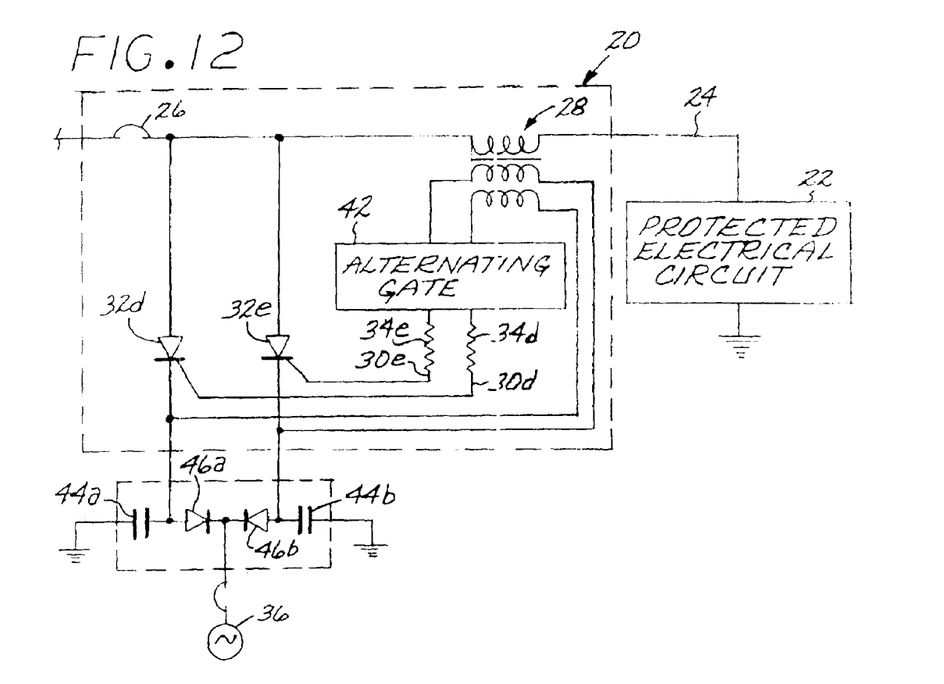
FIG. 12 is a schematic circuit diagram of an arc-fault detecting circuit breaker system with single-phase electrical power and with an alternating SCR gate enable circuit and positive cycle protection at the activating element alternating current voltage source.
Figure 13:
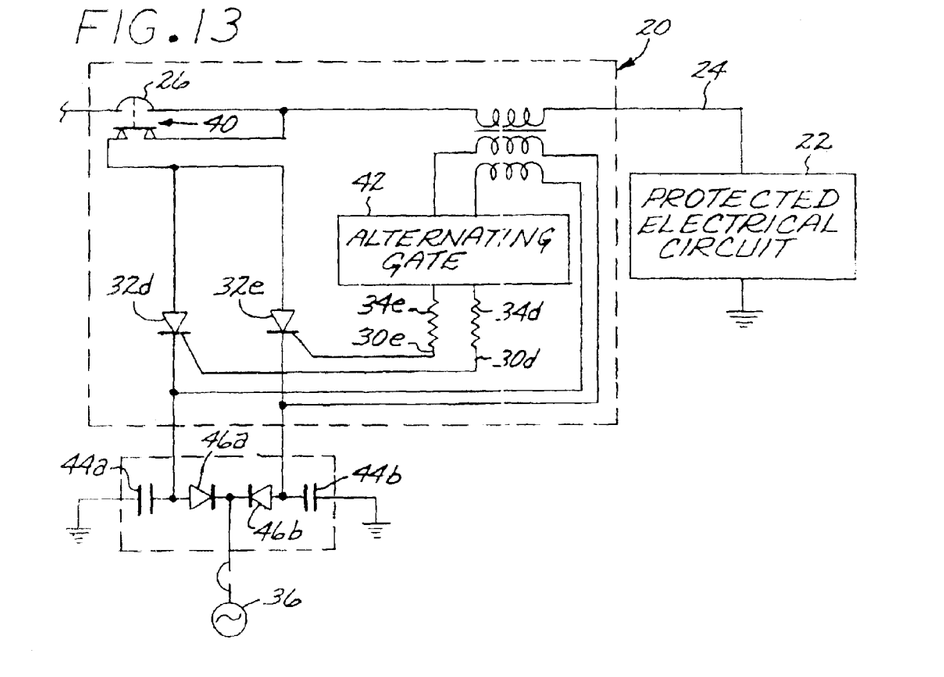
FIG. 13 is a schematic circuit diagram of an arc-fault detecting circuit breaker system with single-phase electrical power and with alternating SCR gate enable circuit and positive cycle protection at the activating element alternating current voltage source, and with SCR anode interruption contacts.
Figure 14:
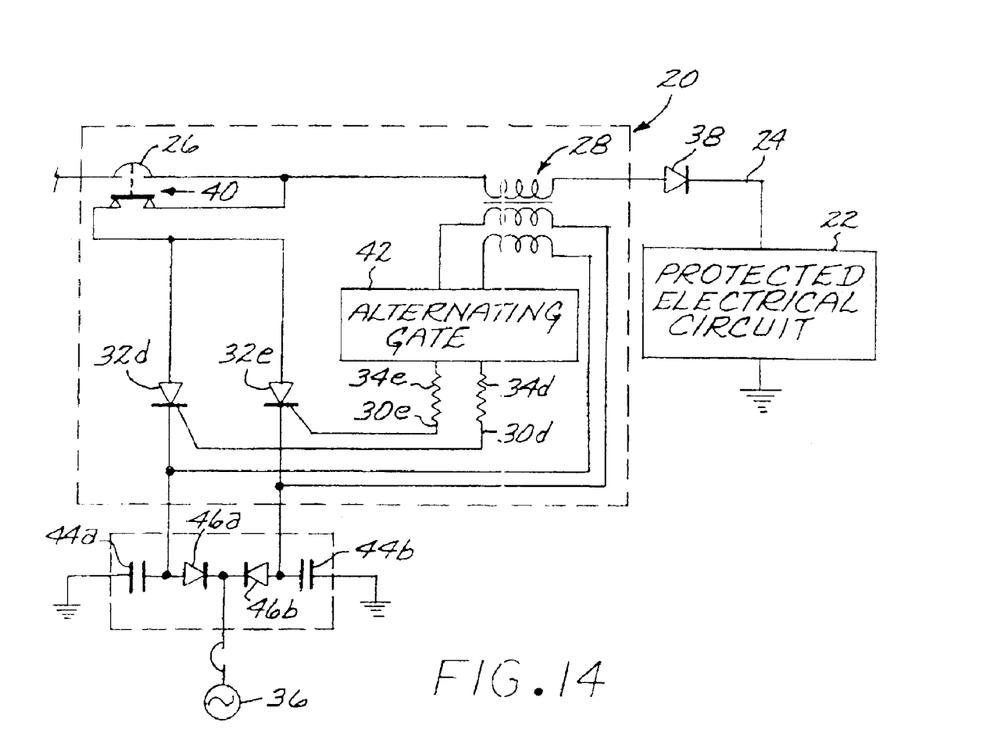
FIG. 14 is a schematic circuit diagram of an arc-fault detecting circuit breaker system with single-phase electrical power and with alternating SCR gate enable circuit and positive cycle protection at the activating element alternating current voltage source, and with reverse diode protection at the load terminal and SCR anode interruption contacts.

FIGS. 12–14 illustrates other embodiments using a single-phase circuit-breaker activating element 36, but which may be adapted for multiphase use in the manner discussed in relation to FIGS. 6–11, which is incorporated. An alternating gate circuit 42 activates the gates of the SCRs 32d and 32e in an alternating fashion. A capacitor 44a and a diode 46a are connected between the SCR 32d and the activating element AC voltage source 36. A capacitor 44b and a diode 46b are connected between the SCR 32e and the activating element AC voltage source 36. The respective capacitors 44a, 44b are kept in a state of negative charge by the AC connection and the respective diodes 46a and 46b. If the detector 28 is triggered while the AC voltage of the activating element AC voltage source 36 is above the protected power voltage, the respective capacitor 44a, 44b provides the operating voltage to activate the respective SCR 32d, 32e and divert the power away from the fault. This will continue until the respective capacitor 44a, 44b is discharged. If the AC power voltage drops below the protected power voltage while the respective capacitor 44a, 44b is still flowing current, the respective SCR 32d, 32e will continue to flow power, but through the respective diode 46a, 46b instead of to the respective capacitor 44a, 44b. The respective SCR 32d, 32e will stop flowing current when the AC voltage again rises above the protected power voltage. The respective capacitor 44a, 44b will be recharged by the AC power of the activating element AC voltage source 36 on its next negative voltage cycle. At the instant that the voltage of the circuit-breaker activating element 36 goes above the protected power voltage, the other SCR gate circuit is enabled and the first SCR gate is disabled. The second SCR is ready at that time to provide protection with a fully charged capacitor. Any arc will be diverted immediately away from the fault. This alternating of the SCRs provides the best DC protection using single phase protective power. It also improved the various AC protection scenarios as well.

The embodiments of FIGS. 13 and 14 are similar to that of FIG. 12, except that they add SCR anode interruption contacts 40 in both embodiments, and a power diode 38 in the embodiment of FIG. 14, which function in the manner discussed earlier.

The various embodiments of FIGS. 6–14 provide additional protection for the protected electrical circuit 22, but they are also more complex and occupy a larger volume. The selection of the embodiments of FIGS. 2–14 is made to balance the requirements of protection and size/weight.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An arc-fault detecting circuit-breaker system operable with a protected electrical circuit, the arc-fault detecting circuit-breaker system comprising:
    a normally closed line circuit breaker connected in series by an electrical line with the protected electrical circuit whose current flow is to be interrupted upon the occurrence of an arc fault;
    a detector of a rate of change with time of the current flow in at least one of the protected electrical circuit and the electrical line;
    an activating element alternating current voltage source having an activating element alternating current output at an activating element alternating current output frequency; and
    a circuit-breaker activating element operable responsive to the detector, wherein the circuit-breaker activating element is electrically connected between the electrical line and the activating element alternating current output, and wherein the circuit-breaker activating element is a normally open switch that closes to establish a connection between the electrical line and the alternating current output in the event that the detector detects the rate of change with time of the current flow in excess of a permitted maximum rate-of-change value.

2. The circuit breaker system of claim 1, wherein the protected electrical circuit is a direct current device.

3. The circuit breaker system of claim 1, wherein the protected electrical circuit is an alternating current device having a protected-circuit frequency of no greater than about 200 Hertz.

4. The circuit breaker system of claim 1, wherein the protected electrical circuit is an alternating current device having a protected-circuit frequency, and wherein the activating element alternating current output frequency is at least twice that of the protected-circuit frequency.

5. The circuit-breaker system of claim 1, wherein the line circuit breaker is a resettable circuit breaker.

6. The circuit-breaker system of claim 1, wherein the detector comprises a transformer.

7. The circuit-breaker system of claim 1, wherein the activating element is a silicon-controlled rectifier having a gate of the silicon-controlled rectifier in electrical communication with a detector output signal of the detector.

8. The circuit breaker system of claim 1, wherein the activating element alternating current output frequency is in excess of about 200 Hertz.

9. The circuit breaker system of claim 1, wherein the activating element alternating current output frequency is about 400 Hertz.

10. The circuit breaker system of claim 1, wherein the activating element alternating current voltage source is a single phase voltage source.

11. The circuit breaker system of claim 1, wherein the activating element alternating current voltage source is a two phase voltage source.

12. The circuit breaker system of claim 1, wherein the activating element alternating current voltage source is a three phase voltage source.

13. The circuit breaker system of claim 1, further including
    an impedance connected between the detector and the circuit breaker activating element.

14. The circuit breaker system of claim 1, further including
    a power diode in series between the circuit breaker and the protected electrical circuit.

15. The circuit breaker system of claim 1, wherein there are two circuit-breaker activating elements, and wherein the circuit breaker system further includes
    an alternating gate circuit that alternatingly delivers an output of the detector to the two circuit breaker activating elements.

16. The circuit breaker system of claim 1, wherein the circuit-breaker activating element comprises two silicon-controlled rectifiers, and wherein the circuit breaker system further includes
    an alternating gate circuit that alternatingly connects an output of the detector to the gates of the two silicon-controlled rectifiers.

17. An arc-fault detecting circuit-breaker system operable with a direct current protected electrical circuit having a protected-circuit input that receives a direct current electrical signal, the arc-fault detecting circuit-breaker system comprising:

a normally closed line circuit breaker having an electrical input and an electrical output;

an electrical line connecting the electrical output of the normally closed line circuit breaker to the protected-element input;

a detector of a rate of change with time of a current flow in the electrical line;

an activating element alternating current voltage source having an activating element alternating current output at an activating element alternating current output frequency; and     a circuit-breaker activating element operable responsive to the detector, wherein the circuit-breaker activating element is electrically connected between the electrical line and the alternating current output, and wherein the circuit breaker activating element is a normally open switch that closes to establish a connection between the electrical line and the alternating current output in the event that the detector detects the rate of change with time of the current flow in excess of a permitted maximum rate-of-change value.

18. An arc-fault detecting circuit-breaker system operable with a protected electrical circuit having a protected circuit input that receives an alternating current electrical signal at a protected circuit frequency, the arc-fault detecting circuit-breaker system comprising:

a normally closed line circuit breaker having an electrical input and an electrical output;

an electrical line connecting the electrical output of the normally closed line circuit breaker to the protected-element input;

a detector of a rate of change with time of a current flow in the electrical line;

an activating element alternating current voltage source having an activating element alternating current output at an activating element alternating current output frequency at least twice that of the protected-circuit frequency; and     a circuit-breaker activating element operable responsive to the detector, wherein the circuit-breaker activating element is electrically connected between the electrical line and the alternating current output, and wherein the circuit breaker activating element is a normally open switch that closes to establish a connection between the electrical line and the alternating current output in the event that the detector detects the rate of change with time of the current flow in excess of a permitted maximum rate-of-change value.

* * * * *

UNITED STATES PATENT AND TRADEMARK OFFICE
CERTIFICATE OF CORRECTION

| | | |
|---|---|---|
| PATENT NO. | : 7,035,066 B2 | Page 1 of 1 |
| APPLICATION NO. | : 10/328658 | |
| DATED | : April 25, 2006 | |
| INVENTOR(S) | : Roy P. McMahon et al. | |

It is certified that error appears in the above-identified patent and that said Letters Patent is hereby corrected as shown below:

Column 2, line 29 delete "such a low-frequency" and replace with --such as a low-frequency--.

Column 6, line 5 delete "electrical circuits 22" and replace with --electrical circuit 22--.

Column 10, lines 45-46 delete "including" and replace with --including:--.

Column 10, lines 49-50 delete "including" and replace with --including:--.

Column 10, line 55 delete "includes" and replace with --includes:--.

Column 10, line 62 delete "includes" and replace with --includes:--.

Signed and Sealed this

Fifth Day of June, 2007

JON W. DUDAS
*Director of the United States Patent and Trademark Office*